US012676096B2

(12) United States Patent
Luo

(10) Patent No.: US 12,676,096 B2
(45) Date of Patent: Jul. 7, 2026

(54) METHOD FOR DRIVING DISPLAY OF DISPLAY PANEL, DISPLAY DRIVER AND ELECTRONIC DEVICE

(71) Applicants: WUHAN TIANMA MICROELECTRONICS CO., LTD., Wuhan (CN); WUHAN TIANMA MICROELECTRONICS CO., LTD. SHANGHAI BRANCH, Shanghai (CN)

(72) Inventor: Heng Luo, Shanghai (CN)

(73) Assignees: WUHAN TIANMA MICROELECTRONICS CO., LTD., Wuhan (CN); WUHAN TIANMA MICROELECTRONICS CO., LTD. SHANGHAI BRANCH, Shanghai (CN)

( * ) Notice: Subject to any disclaimer, the term of this patent is extended or adjusted under 35 U.S.C. 154(b) by 110 days.

(21) Appl. No.: 18/811,818

(22) Filed: Aug. 22, 2024

(65) Prior Publication Data

US 2024/0412677 A1 Dec. 12, 2024

(30) Foreign Application Priority Data

Feb. 5, 2024 (CN) ......................... 202410166093.9

(51) Int. Cl.
*G09G 3/20* (2006.01)

(52) U.S. Cl.
CPC ... *G09G 3/2074* (2013.01); *G09G 2320/0233* (2013.01); *G09G 2320/0686* (2013.01); *G09G 2330/021* (2013.01); *G09G 2340/0407* (2013.01)

(58) Field of Classification Search
None
See application file for complete search history.

(56) References Cited

U.S. PATENT DOCUMENTS

2010/0149314 A1* 6/2010 Schwerdtner ............ G03H 1/08 348/E15.001
2018/0130401 A1 5/2018 Xiang et al.
2023/0334621 A1* 10/2023 Landvater .............. G16H 30/20

FOREIGN PATENT DOCUMENTS

CN 107506161 A 12/2017
CN 107527051 A 12/2017

* cited by examiner

*Primary Examiner* — Frank S Chen
(74) *Attorney, Agent, or Firm* — KILPATRICK TOWNSEND & STOCKTON LLP

(57) ABSTRACT

A method for driving display of a display panel, a display driver and an electronic device are provided. The display panel includes a display array for displaying an image, the display array includes multiple pixel units arranged in an array, the method includes: obtaining to-be-displayed data of the pixel units; dividing the display array into at least two sub-display-areas with different priorities based on the to-be-displayed data of each pixel unit, each sub-display-area includes multiple pixel units arranged consecutively; and controlling the pixel units in each sub-display-area for image display based on the priority; controlling, for a sub-display-area with highest priority, the pixel units for image display based on the to-be-displayed data; controlling, for a sub-display-area with non-highest priority, at least part of the pixel units for image display based on corrected display data.

21 Claims, 10 Drawing Sheets

METHOD FOR DRIVING DISPLAY OF DISPLAY PANEL, DISPLAY DRIVER AND ELECTRONIC DEVICE

This application claims priority to Chinese Patent Application No. 202410166093.9, filed on Feb. 5, 2024 with the China National Intellectual Property Administration, which is hereby incorporated by reference in its entirety.

FIELD

The present disclosure relates to the field of display control technology, and in particular to a method for driving display of a display panel, a display driver and an electronic device.

BACKGROUND

As science and technology develop, an increasing number of electronic devices with display functions are being widely used in the daily lives and work of individuals, bringing great convenience and becoming indispensable tools in our society.

The essential component that enables the display function in the electronic device is a display panel. Currently, when a conventional electronic device controls a display panel to display images, the display panel can only display images based on to-be-displayed data in a single display mode.

SUMMARY

In one embodiment, a method for driving display of a display panel is provided according to an embodiment of the present disclosure. The display panel includes a display array for displaying an image, the display array includes multiple pixel units arranged in an array, where the method includes:

- obtaining to-be-displayed data of the pixel units;
- dividing the display array into at least two sub-display-areas with different priorities based on the to-be-displayed data of each of the multiple pixel units, where each sub-display-area includes multiple pixel units arranged consecutively; and
- controlling the pixel units in each sub-display-area for image display based on the priority, where controlling, for a sub-display-area with a highest priority in the at least two sub-display-areas, the pixel units for image display based on the to-be-displayed data; controlling, for a sub-display-area with a non-highest priority in the at least two sub-display-areas, at least part of the pixel units for image display based on corrected display data.

In one embodiment, a display driver configured to implement the above method for driving display of the display panel is provided, the display driver includes:

- an obtaining module, configured to obtain to-be-displayed data of the pixel units;
- a dividing module, configured to divide the display array into at least two sub-display-areas with different priorities based on the to-be-displayed data of each of the multiple the pixel units, where each sub-display-area includes a multiple pixel units arranged consecutively; and
- a driving module, configured to control the pixel units in each sub-display-area for image display based on the priority, including: control the pixel units for image display based on the to-be-displayed data for a sub-display-area with a highest priority in the at least two sub-display-areas, and control at least part of the pixel units for image display based on corrected display data for a sub-display-area with a non-highest priority in the at least two sub-display-areas.

In one embodiment, an electronic device is provided according to an embodiment of the present disclosure. The electronic device includes: a display panel; a display driver, configured to control the display panel to display an image based on the above method for driving display of the display panel.

BRIEF DESCRIPTION OF THE DRAWINGS

Hereinafter drawings in the description of embodiments or conventional technologies would be briefly described, in order to clarify the embodiments of the present disclosure or related technologies. Apparently, the drawings in the following description are only embodiments of the present disclosure.

The structures, proportions, sizes shown in the drawings of this specification are only configured to coordinate with the content disclosed in the specification and are for the understanding and reading of people familiar with this technology, and are not configured to limit conditions for the implementation of the present disclosure. Therefore, there is no substantive significance. Any structural modifications, changes in proportions or adjustments in size should still fall within the scope of the technology disclosed in the present disclosure without affecting the effectiveness and purpose of the present disclosure.

DETAILED DESCRIPTION

Hereinafter the embodiments in the present disclosure are described clearly and thoroughly in conjunction with the accompanying drawings in the embodiments of the present disclosure. The embodiments described are only some, not all of the embodiments of the present disclosure.

Various modifications and changes may be made to the present disclosure without departing from the embodiments of the present disclosure. Hence, it is intended to cover modifications and variations made to the present disclosure that fall within the scope of the corresponding claims (technical solutions as claimed) and their equivalents. It should be noted that embodiments of the present disclosure can be combined as long as they do not contradict with each other.

In order to clarify the embodiments of the present disclosure, the present disclosure is described in conjunction with the drawings and some embodiments hereinafter.

Figure 1:
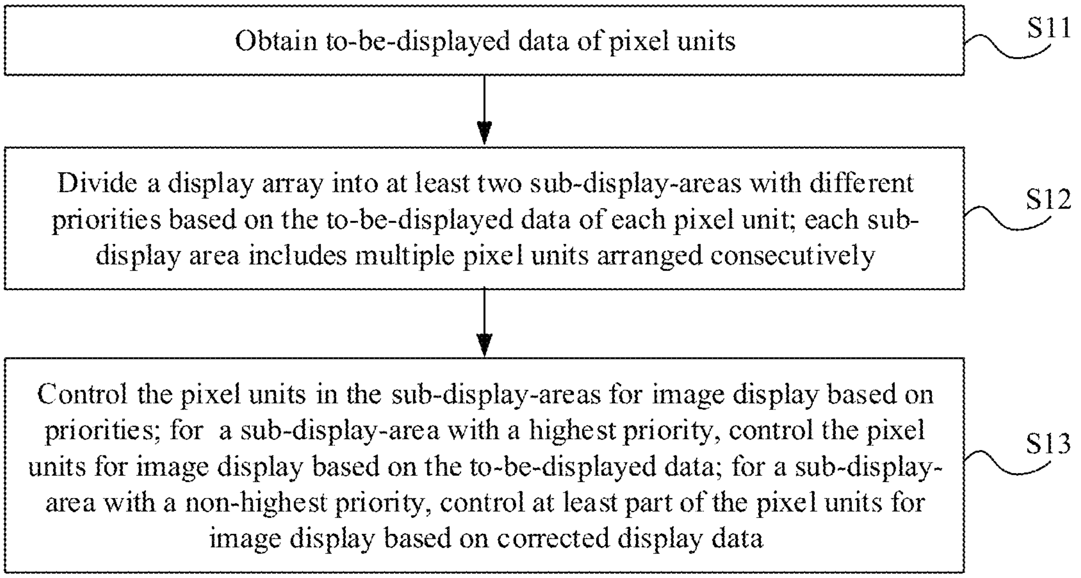
FIG. 1 is a schematic flowchart of a method for driving display according to an embodiment of the present disclosure.

Reference is made to FIG. 1. FIG. 1 is a schematic flowchart of a method for driving display according to an embodiment of the present disclosure. The method for driving display is applied to a display panel. The display panel includes a display array for displaying an image, and the display array includes multiple pixel units arranged in an array. The method includes step S11 to step S13 as follows.

In step S11, to-be-displayed data of each of the multiple pixel units is obtained.

In step S12, the display array is divided into at least two sub-display-areas with different priorities based on the to-be-displayed data of each pixel unit; each sub-display-area includes multiple pixel units arranged consecutively.

Since the sub-display-area includes multiple consecutively arranged pixel units, each sub-display-area is a consecutive display area in the display array.

In step S13, the pixel units in the sub-display-area is controlled for image display based on priorities; for the sub-display-area with the highest priority, the pixel units are controlled for image display based on the to-be-displayed data; for the sub-display-area with non-highest priority, at least part of pixel units are controlled for image display based on corrected display data.

The method for driving display according to the embodiment of the present disclosure can control the pixel units for image display based on the to-be-displayed data according to the priorities of the sub-display-areas, or control the pixel units for image display based on the corrected display data, which offers diversified display modes.

In one embodiment, based on the setting manner of priorities and the sub-display-areas according to embodiments of the present disclosure, as well as the corresponding setting manner of priorities and the corrected display data, the power consumption of the display panel can be reduced to lower the power usage for display while retaining the quality of the screen information of the to-be-displayed image obtained by the human eyes. The embodiments of the present disclosure can reduce the power consumption for display while retaining essential screen information in the to-be-displayed image to the greatest extent. The to-be-displayed image is an image that can be displayed by the display panel when all the pixel units in the display array have corresponding to-be-displayed data for image display.

In one embodiment, the priority may indicate a degree of impact of the sub-display-area on the to-be-displayed image on the display panel, and the degree of impact is positively correlated with the priority. When all pixel units in the display array display based on their corresponding to-be-displayed data, the display panel may display the to-be-displayed image. In this method, the corrected display data may enable a pixel unit to display a first brightness, while the to-be-displayed data may enable a pixel unit to display a second brightness, where the first brightness is less than the second brightness. For a sub-display-area, the to-be-displayed color information of the sub-display-area may be determined based on the to-be-displayed data of the pixel units. The to-be-displayed color information may indicate the color richness of the pixel units in the sub-display-area when displaying the image based on the to-be-displayed data.

In an embodiment, a grayscale value of the corrected display data is less than the grayscale value of the to-be-displayed data, and the first brightness is less than the second brightness.

The above priority may represent the degree of impact of the sub-display-area on the current to-be-displayed image on the display panel. Since the degree of impact is positively correlated with the priority, the greater the sub-display-area impacts the to-be-displayed image, the higher the priority of the sub-display-area is. On the contrary, the lesser the sub-display-area impacts the to-be-displayed image, the lower the priority of the sub-display-area is.

For the sub-display-area with the highest priority, the pixel units are controlled to faithfully reproduce based on the to-be-displayed data, to faithfully reproduce the screen information corresponding to the to-be-displayed data. For the sub-display-area with non-highest priority, since at least part of the pixel units are controlled for image display based on the corrected display data, these pixel units perform non-faithful reproduction based on the corrected display data. In addition, by configuring the first brightness less than the second brightness and the higher priority with the smaller difference between the second brightness and the first brightness, the power consumption for display of the display panel may be reduced by compromising the display brightness of the sub-display-area with non-highest priority.

The display panel is the main component of electronic device for consuming power, and the power consumption of the display panel is the main factor affecting the battery life of electronic device. The battery storage capacity of the electronic device is limited by the internal space and battery capacity of the electronic device. In a case that the power consumption of the display panel is too large, the battery life of the electronic device may be significantly reduced. The technical solutions of embodiments of the present disclosure can reduce the power consumption for display of the display panel by compromising the display brightness of the sub-display-area that has a small impact on the to-be-displayed image, to improve the battery life of the electronic device.

In one embodiment, for sub-display-area with the non-highest priority, the difference between the second brightness and the first brightness is negatively correlated with the priority of the sub-display-area. In an embodiment, the higher the priority of the sub-display-area, the smaller the difference between the second brightness and the first brightness. On the contrary, in a case that the priority of the sub-display-area is lower, the difference between the second brightness and the first brightness is larger. In this method, the sub-display-area with a higher priority has a lesser brightness reduction, and the sub-display-area with a lower priority has a greater brightness reduction.

By configuring the difference between the second brightness and the first brightness to be negatively correlated with the priority of the sub-display-area, a sub-display-area with a low priority that has less impact on the to-be-displayed image can be used to reduce the power consumption of the display panel. In addition, it can prevent the display brightness of the sub-display-area with a high priority from changing significantly, to eliminate large deviations in the actual display image of the display panel relative to the to-be-displayed image.

In one embodiment, for the sub-display-area with non-highest priority, in the same sub-display-area, the to-be-displayed data of the pixel units are scaled down based on the same proportional coefficient to obtain the corrected display data. And each pixel unit is controlled for image display based on the corresponding corrected display data. The to-be-displayed data is set as D0 and the corrected display data is set as D1, then D1=k*D0, k is the proportional coefficient, and k is a positive number less than 1.

For the sub-display-area with non-highest priority, the to-be-displayed data of all pixel units in the same sub-display-area may be directly scaled down based on the same proportional coefficient. The light-emitting brightness of all pixel units in the sub-display-area may be reduced in equal proportions without affecting the color information displayed in the sub-display-area.

In another embodiment, the corrected display data is a preset low-grayscale display data. For the sub-display-area with non-highest priority, at least part of pixel units are controlled for image display based on the to-be-displayed data. For the same pixel unit, the grayscale value of the corresponding low-grayscale display data is less than the grayscale value of the corresponding to-be-displayed data.

When the sub-display-area with non-highest priority uses the preset low-grayscale display data as the corrected display data, the grayscale value of the low-grayscale display data is no greater than the preset grayscale, and the preset grayscale may be a grayscale value less than 10, or a grayscale value less than 5.

For the sub-display-area with non-highest-priority, in the same sub-display-area, a part of the pixel units is controlled for image display based on the to-be-displayed data to eliminate large deviations in the actual display image relative to the to-be-displayed image in the sub-display-area, and another part of the pixel units is controlled for image display based on preset low-grayscale display data through compromising the display effect of this part of the pixel units to reduce the power consumption of the display panel.

Figure 2:
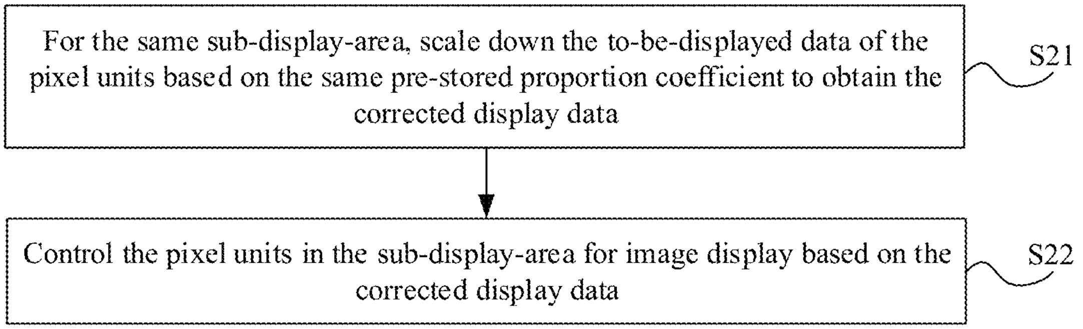
FIG. 2 is a flowchart of a method for controlling pixel units in a sub-display-area for image display according to an embodiment of the present disclosure.

For the same sub-display-area with non-highest priority, when the to-be-displayed data of the pixel units are scaled down based on the same proportional coefficient, based on the above embodiment, a method for controlling image display of pixel units in the sub-display-area with non-highest priority may be shown in FIG. 2.

Reference is made to FIG. 2. FIG. 2 is a flowchart of a method for controlling pixel units in a sub-display-area for image display according to an embodiment of the present disclosure. The method includes steps S21 to S22.

In step S21, for the same sub-display-area, the to-be-displayed data of the pixel units are scaled down based on the same pre-stored proportional coefficient to obtain the corrected display data.

As described above, for the sub-display-area with non-highest priority, the corrected display data of the pixel units is equal to the product of the corresponding proportional coefficient and the to-be-displayed data.

In step S22, the pixel units in the sub-display-area are controlled for image display based on the corrected display data.

The proportional coefficient is negatively correlated with the priority of the sub-display-area. In an embodiment, the higher the priority is, the smaller the corresponding proportional coefficient is. On the contrary, the lower the priority is, the larger the corresponding proportional coefficient is, to prevent the display brightness of the sub-display-area with a high priority from changing significantly.

The proportional coefficient corresponding to each priority may be pre-stored based on the set priority. When the display array is divided into multiple sub-display-areas and the priorities of the sub-display-areas are determined, the corresponding proportional coefficients may be determined based on the priorities of the sub-display-areas. The proportional coefficient corresponding to the highest priority is set to 1, and the proportional coefficient corresponding to non-highest priority is a positive number less than 1. In this way, the pixel units in the sub-display-area with the highest priority can perform faithful reproduction based on the to-be-displayed data. For the sub-display-area with non-highest priority, the pixel units in the sub-display-area can perform non-faithful reproduction based on the corrected display data correlated with the corresponding proportional coefficient.

In the method shown in FIG. 2, the higher priority the sub-display-area is, the smaller the reduction of the corrected display data of the pixel units relative to the to-be-displayed data is, to prevent the display brightness of the sub-display-area with a high priority from changing significantly. The lower priority the sub-display data is, the larger reduction of the corrected display data of the pixel units relative to the to-be-displayed data is. This method uses the sub-display-area with a low priority that has less impact on the to-be-displayed image to reduce the power consumption of the display panel.

Figure 3:
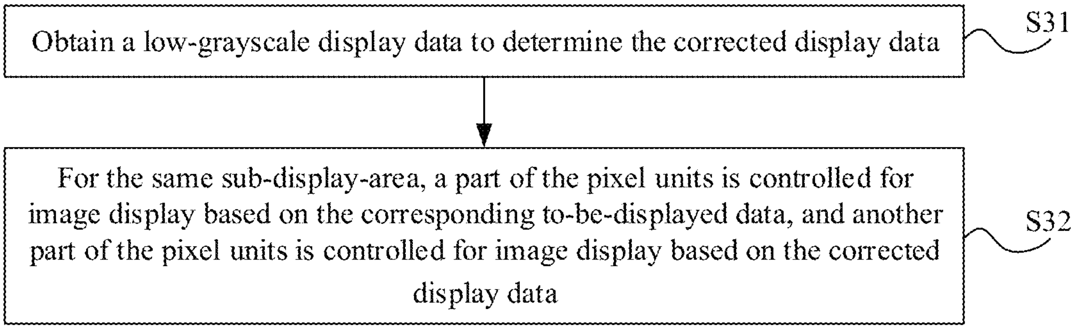
FIG. 3 is a flowchart of a method for controlling pixel units in a sub-display-area for image display according to still another embodiment of the present disclosure.

For the same sub-display-area with non-highest priority, when the corrected display data is a preset low-grayscale display data, based on the above embodiment, a method for controlling pixel units in the sub-display-area with non-highest-priority for image display may be shown in FIG. 3.

Reference is made to FIG. 3. FIG. 3 is a flowchart of a method for controlling pixel units in a sub-display-area for image display according to another embodiment of the present disclosure. The method includes steps S31 to S32.

In step S31, low-grayscale display data is obtained to determine the corrected display data.

In step S32, for the same sub-display-area, a part of the pixel units is controlled for image display based on the corresponding to-be-displayed data, and another part of the pixel units is controlled for image display based on the corrected display data.

In one embodiment, in the sub-display-area, the proportion of the number of pixel units for image display based on the corrected display data is negatively correlated with the priority of the sub-display-area. In an embodiment, the higher the priority is, the greater the number is. On the contrary, the lower the priority is, the smaller the number is. In this way, for the sub-display-area with a high priority, the number of pixel units that perform faithful reproduction based on the to-be-displayed data is larger, to prevent the display effect of the sub-display-area with a high priority that has a greater impact on the to-be-displayed image from changing significantly, which can eliminate large deviations in the actual display image of the display panel relative to the to-be-displayed image. For the sub-display-area with a low priority, the number of pixel units that perform non-faithful reproduction based on the corrected display data is larger, the power consumption of the display panel is reduced based on the sub-display-area with the low priority that has less impact on the to-be-displayed image, to ensure the display effect while reducing the power consumption of the display panel.

Based on the set priority, the quantity proportion corresponding to each priority may be pre-stored, which is the percentage of the number of pixel units that perform non-faithful reproduction based on the corrected display data in the sub-display-area with the corresponding priority to the total pixel units in the sub-display-area. When the display array is divided into multiple sub-display-areas and the priorities of the sub-display-areas are determined, the corresponding quantity proportion may be determined based on the priority of each of the sub-display-areas. Then, the number of pixel units in each sub-display-area required to reproduce unfaithfully based on the corrected display data is determined based on the quantity proportion. The quantity proportion corresponding to the highest priority is 0, and the quantity proportion corresponding to non-highest priority is greater than 0 and less than 100%. In this way, the pixel units in the sub-display-area with the highest priority can perform faithful reproduction based on the to-be-displayed data. For the sub-display-area with the non-highest priority, a number of pixel units in the sub-display-area can perform non-faithful reproduction based on the corrected display data, where the number of pixel units is associated with the priority of the sub-display-area.

In the method shown in FIG. 3, a same priority may be set to correspond to the same low-grayscale display data. Different priorities may be set to correspond to the same low-grayscale display data. In this case, for the sub-display-areas with non-highest priority, all sub-display-areas use the same low-grayscale display data to facilitate display control.

When different priorities correspond to the same low-grayscale display data, the preset low-grayscale display data may be display data of 0 grayscale value. In a case that the preset low-grayscale display data is the display data of 0 grayscale value, for the same non-highest priority sub-display-area, some pixel units are directly turned off through the display data of 0 grayscale value to reduce the power consumption of the display panel. In this case, the control method is simple. When different priorities correspond to the same low-grayscale display data, the grayscale value corresponding to the low-grayscale display data may be set based on the requirements, which is not limited to 0 grayscale value. The grayscale value corresponding to the low-grayscale display data is not limited in the embodiment of the present disclosure.

In the method shown in FIG. 3, the same priority may be set to correspond to the same low gray-scale display data. Different priorities may be set to correspond to different low gray-scale display data, and the priority is positively correlated with the low-grayscale display data. In this method, low-grayscale display data corresponding to each non-highest priority is pre-stored, where different low-grayscale display data corresponding to different priorities. In an embodiment, the higher the priority is, the larger the grayscale value of the corresponding preset grayscale value display data is. On the contrary, the lower the priority is, the smaller the grayscale value of the corresponding preset low-grayscale display data is.

Figure 4:
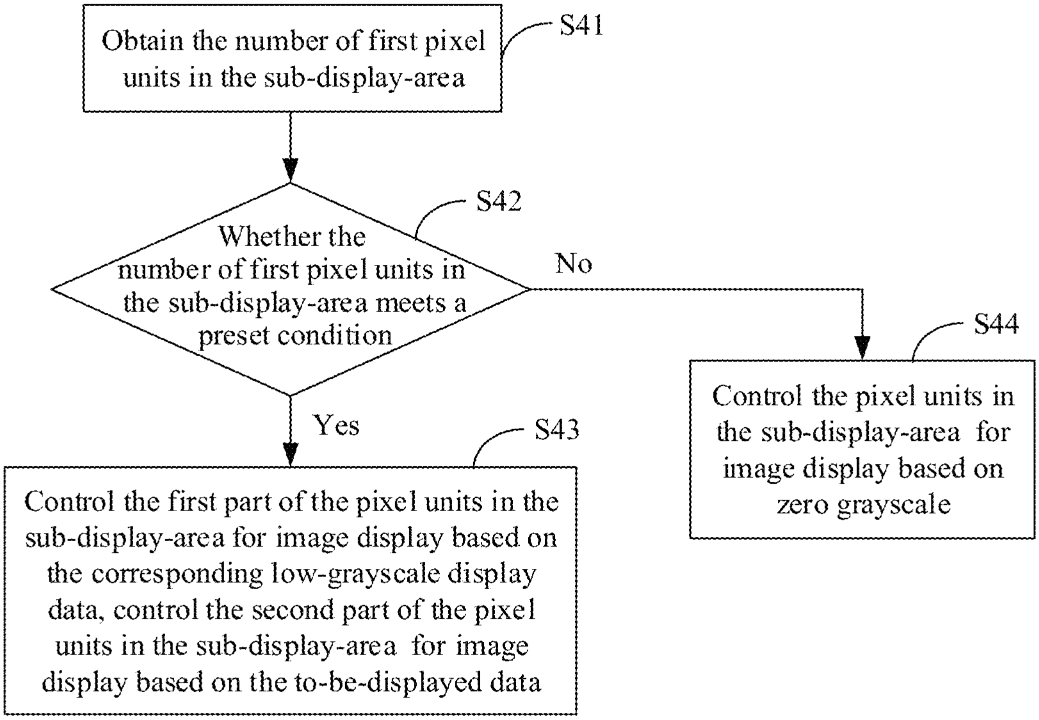
FIG. 4 is a flowchart of a method for controlling pixel units in a sub-display-area for image display according to yet another embodiment of the present disclosure.

When different priorities correspond to different low-grayscale display data, the method for controlling the pixel unit for image display in step S32 may be as shown in FIG. 4.

Reference is made to FIG. 4. FIG. 4 is a flowchart of a method for controlling pixel units in a sub-display-area for image display according to another embodiment of the present disclosure. The method includes steps S41 to S44.

In step S41, the number of first pixel units in the sub-display-area is obtained.

For a sub-display-area with a non-highest priority, in a case that the to-be-displayed data of the pixel unit is greater than the low-grayscale display data corresponding to the sub-display-area, the pixel unit is a first pixel unit.

In step S42, whether the number of first pixel units in the sub-display-area meets a preset condition is determined.

As described above, for each non-highest priority, different priorities are configured with a corresponding quantity proportion of pixel units for image display based on the corrected display data. In a case that the ratio of the number of the first pixel units to the total number of pixel units in the sub-display-area is no less than the quantity proportion corresponding to the priority of the sub-display-area, the preset condition is met. Otherwise, in a case that the ratio of the first pixel units to the total number of pixel units in the sub-display-area is less than the quantity proportion corresponding to the priority of the sub-display-area, the preset condition is not met.

In step S43, in a case that the preset condition is met, a first part of the pixel units in the sub-display-area is controlled for image display based on the corresponding low-grayscale display data, and a second part of the pixel units in the sub-display-area is controlled for image display based on the to-be-displayed data.

The first part of the pixel units are all first pixel units, and the ratio of the number of the first part of pixel units to the number of all pixel units in the sub-display-area is the quantity proportion corresponding to the priority of the sub-display-area.

In step S44, in a case that the preset condition is not met, the pixel units in the sub-display-area are controlled for image display based on 0 grayscale value.

Based on the method shown in FIG. 4, for the sub-display-area with a non-highest-priority, when the preset condition is met, the pixel units in the quantity proportion corresponding to the priority may be controlled to perform non-faithful reproduction based on the corresponding low-grayscale display data, while other pixel units are controlled to perform faithful reproduction based on the to-be-displayed data. When the preset condition is not met, the pixel units in the sub-display-area are controlled for image display based on 0 grayscale value. Based on the method shown in FIG. 4, when the preset condition is not met, it can prevent the second pixel units from being controlled to perform non-faithful reproduction based on the corresponding low-grayscale display data. For a sub-display-area with a non-highest priority, in a case that the to-be-displayed data of the pixel unit is less than the low-grayscale display data corresponding to the sub-display-area, the pixel unit is the second pixel unit.

Figure 5:
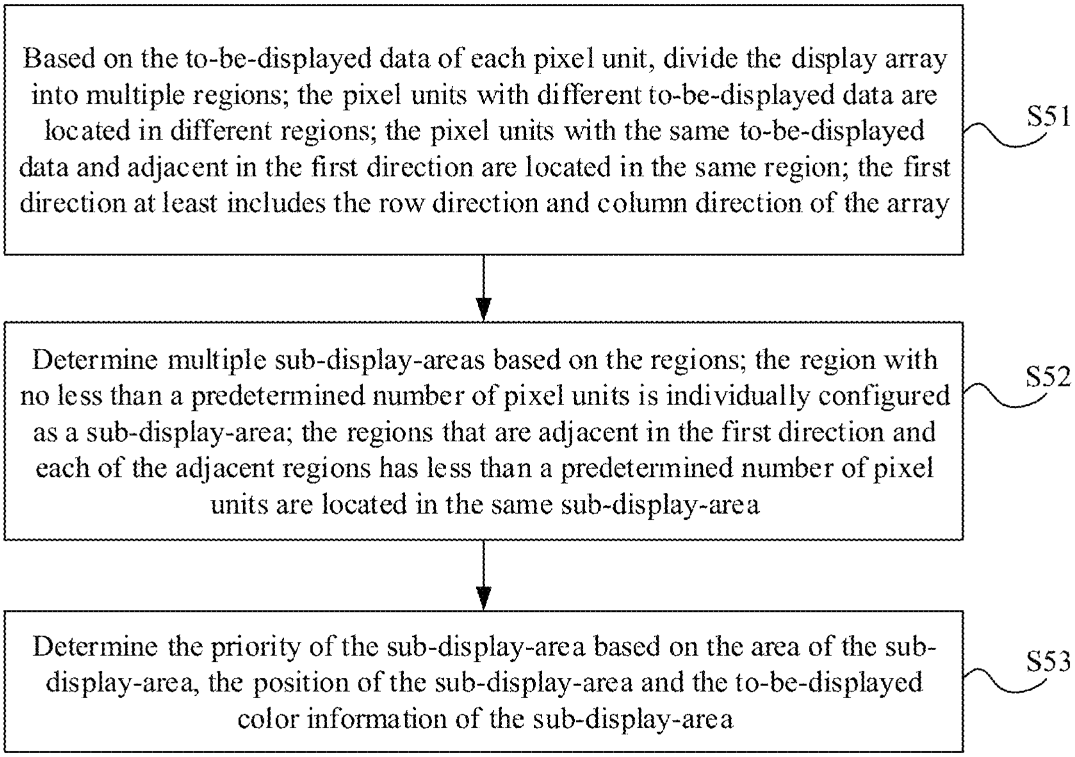
FIG. 5 is a flowchart of a method for dividing a display array into multiple sub-display-areas according to an embodiment of the present disclosure.

In one embodiment, the method for dividing the display array into at least two sub-display-areas with different priorities based on the above to-be-displayed data in each of the pixel units may be shown in FIG. 5.

Reference is made to FIG. 5. FIG. 5 is a flowchart of a method for dividing a display array into multiple sub-display-areas according to an embodiment of the present disclosure. The method includes steps S51 to S53.

In step S51, based on the to-be-displayed data of each of the pixel units, the display array is divided into multiple regions; the pixel units with different to-be-displayed data are located in different regions; the pixel units with the same to-be-displayed data and adjacent in a first direction are located in the same region; the first direction at least includes the row direction and column direction of the array.

In step S52, multiple sub-display-areas are determined based on the regions; the region with no less than a set number of pixel units is individually configured as a sub-display-area; the regions, that are adjacent in the first direction and each of the regions has less than the set number of pixel units, are located in the same sub-display-area.

In step S53, the priority of the sub-display-area is determined based on the area of the sub-display-area, the position of the sub-display-area and the to-be-displayed color information of the sub-display-area.

In the method shown in FIG. 5, the to-be-displayed data of each pixel unit in the display array may be obtained through a pre-display screen signal. Based on the to-be-displayed data of each pixel unit, the display array is divided into multiple regions; multiple sub-display-areas are determined based on the divided regions. After determining the priority of the sub-display-area, for the sub-display-area with a non-highest-priority, the corrected display data corresponding to the sub-display-area may be determined based on the priority thereof.

The sub-display-area with the highest priority is a target region, and the sub-display-area with the non-highest priority is a non-target region. The pixel units in the target region are controlled for image display based on the to-be-displayed data, which may faithfully reproduce the screen information of the to-be-displayed data. As a result, the overall brightness of pixel units in the target region maintains normal display. At least a part of the pixel units in the sub-display-area with the non-highest priority is controlled for image display based on the corrected display data, and these pixel units may not faithfully reproduce the screen information of the to-be-displayed display data. In a case that all pixel units in the non-target region perform non-faithful reproduction based on corrected display data, the display brightness of the entire pixel units in the non-target region is decreased. In a case that some pixel units in the non-target region perform non-faithful reproduction based on corrected display data, the display brightness of those pixel units is decreased.

In one embodiment, for the same sub-display-area, when a part of the pixel units is controlled for image display based on the to-be-displayed data and another part of the pixel units is controlled for image display based on the corrected display data, the two parts of the pixel units may be arranged alternately in the same row and alternately in the same column. In this way, in the same sub-display-area, the pixel units displayed based on the to-be-displayed data and the pixel units displayed based on the corrected display data are evenly arranged in the sub-display-area to ensure the display effect of the sub-display-area with the non-highest priority.

In the method shown in FIG. 5, multiple pixel units with the same to-be-displayed data and consecutively arranged in the first direction may be divided into the same region. In this way, the display array can be divided into multiple different regions based on the to-be-displayed data of each pixel unit. Then each of the regions is divided into different sub-display-areas based on the number of pixel units in the region. The priority of each sub-display-area may be subsequently determined based on the area, position and to-be-displayed color information of the sub-display-area, and the pixel units in each sub-display-area are controlled for image display based on the priority of each sub-display-area, which can reduce the power consumption of the display panel while ensuring the overall display effect of the display panel.

In the method for driving display according to an embodiment of the present disclosure, the pixel unit includes multiple sub-pixels with different light-emitting colors. For example, the pixel unit may be configured to include a red sub-pixel R, a green sub-pixel G and a blue sub-pixel B. In two pixel units with different to-be-displayed data, the sub-pixels of at least one light-emitting color correspond to different to-be-displayed data. The two pixel units with different display data satisfy at least one of the following conditions: the to-be-displayed data of the green sub-pixels G are different, the to-be-displayed data of the red sub-pixels R are different, and the to-be-displayed data of the blue sub-pixels B are different. In two pixel units with the same to-be-displayed data, the sub-pixels of the same emitting color correspond to the same to-be-displayed data. The two pixel units with the same to-be-displayed data satisfy the following conditions: the to-be-displayed data of the green sub-pixels G are the same, the to-be-displayed data of red sub-pixels R are the same, and the to-be-displayed data of the blue sub-pixels B are the same.

Based on the above description, in one embodiment, whether the two adjacent pixel units belong to the same region is determined based on whether the to-be-displayed data of the two adjacent pixel units are the same, to divide the display array into multiple sub-display-areas.

Figure 6:
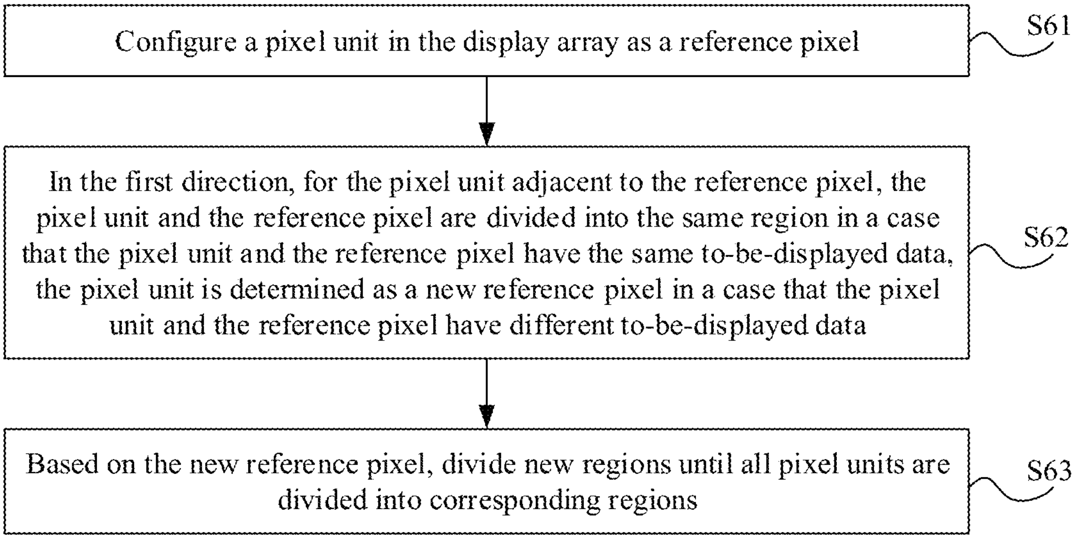
FIG. 6 is a flowchart of a method for dividing a display array into multiple regions according to an embodiment of the present disclosure.

In the above step S51, the method for dividing the display array into multiple regions based on the to-be-displayed data in each pixel unit may be as shown in FIG. 6.

Reference is made to FIG. 6. FIG. 6 is a flowchart of a method for dividing a display array into multiple regions according to an embodiment of the present disclosure. The method includes steps S61 to S63 as follows.

In step S61, a pixel unit in the display array is determined as a reference pixel.

In step S62, in the first direction, for the pixel unit adjacent to the reference pixel, in a case that the pixel unit and the reference pixel have the same to-be-displayed data, the pixel unit and the reference pixel are divided into the same region; in a case that the pixel unit and the reference pixel have different to-be-displayed data, the pixel unit is determined as a new reference pixel.

In step S63: based on the new reference pixel, new regions are divided until all pixel units are divided into corresponding regions.

In the method shown in FIG. 6, the to-be-displayed data for each pixel unit in the display array may be obtained through the pre-display screen signal. Based on the comparison result between the to-be-displayed data of the reference pixel and that of the adjacent pixel unit in the first direction, whether the two adjacent pixel units in the first direction are in the same region is determined, to divide the display array into multiple regions.

Figure 7:
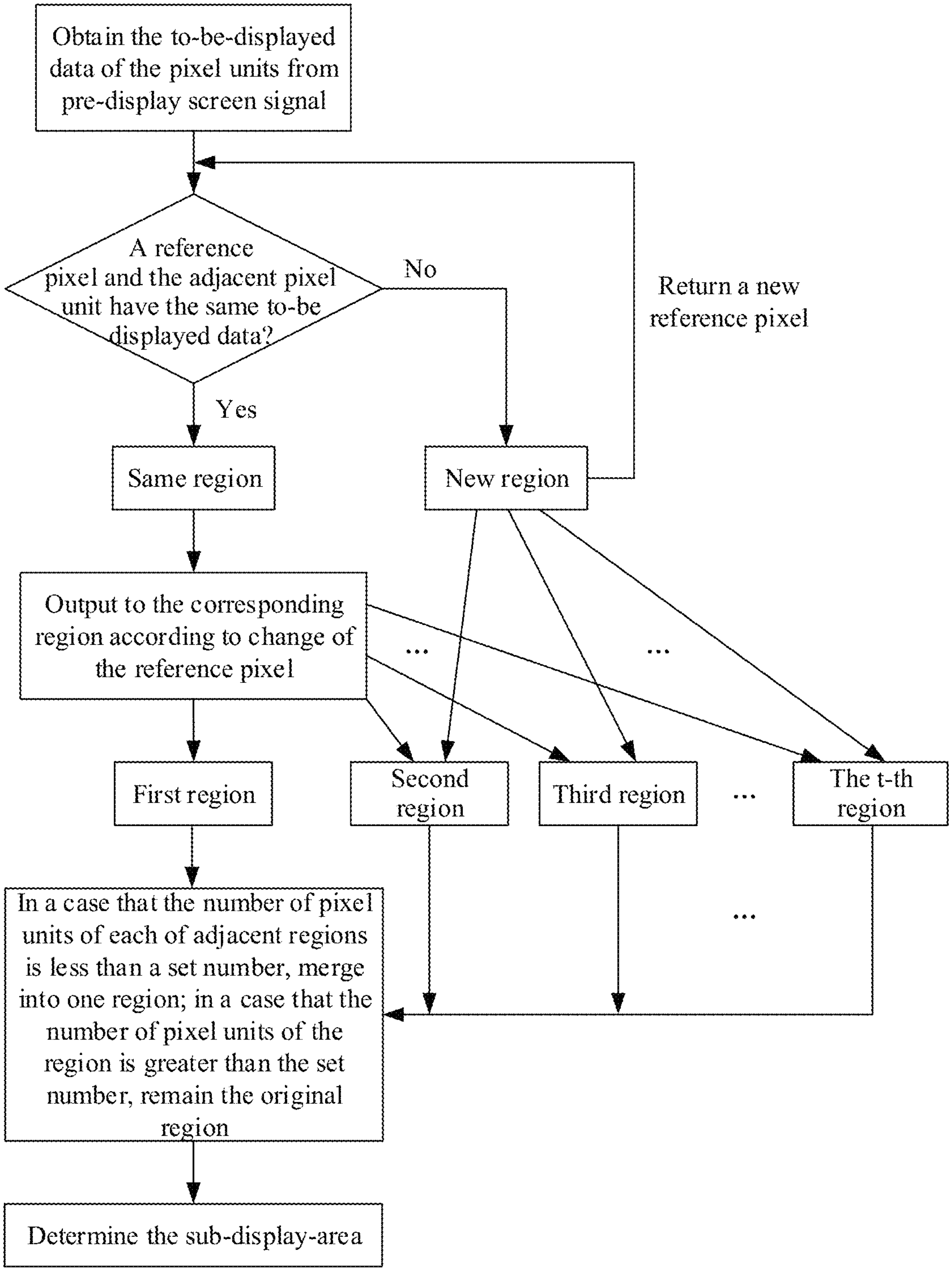
FIG. 7 is a flowchart of a method for dividing a display array into multiple sub-display-areas according to an embodiment of the present disclosure.

Reference is made to FIG. 7. FIG. 7 is a flowchart of a method for dividing a display array into multiple sub-display-areas according to an embodiment of the present disclosure. After obtaining the to-be-displayed data of each pixel unit through the pre-display screen signal, whether the reference pixel is the same as the to-be-displayed data of adjacent pixel units is determined. In a case that the red sub-pixels R of the two pixel units have the same to-be-displayed data, the green sub-pixels G of the two pixel units have the same to-be-displayed data, and the blue sub-pixels B of the two pixel units have the same to-be-displayed data, the two pixel units have the same to-be-displayed data. In a case that the to-be-displayed data of any type of sub-pixels in the two pixel units are different, the to-be-displayed data of the two pixel units are different. In a case that the to-be-displayed data of the reference pixel and the adjacent pixel unit are the same, it indicates that the pixel unit adjacent to the reference pixel is in the same region as the reference pixel; otherwise, it indicates that the pixel unit adjacent to the reference pixel and the reference pixel are located in different regions.

In the method shown in FIG. 7, when the display array is divided into regions, the pixel unit in the first row and first column is selected as the first reference pixel. Compared with the adjacent pixel unit in the first direction, in a case that the light emitting of the first reference pixel and the light emitting of the adjacent pixel unit are the same (have the same to-be-displayed data), the first reference pixel and the adjacent pixel unit are divided into a same region. In a case that the light emitting of the first reference pixel is different from the light emitting of the adjacent pixel unit (have different to-be-displayed data), a new region may be added, where the pixel unit with different to-be-displayed data is divided into the new region, and the pixel unit is determined as a new reference pixel. Then, the comparison is performed based on the new reference pixel until the comparisons of all pixel units are completed and t regions are obtained, where t is a positive integer greater than 1. After the region division is completed, adjacent regions containing less than the set number of pixels are merged into one region, and finally the display array is divided into different regions.

To improve the efficiency of region division, multiple reference pixels may be selected initially. For example, the pixel units at the four top corners of the display array are determined as reference pixels and simultaneously starting the comparisons for the to-be-displayed data, which can complete the region division faster.

Figure 8:
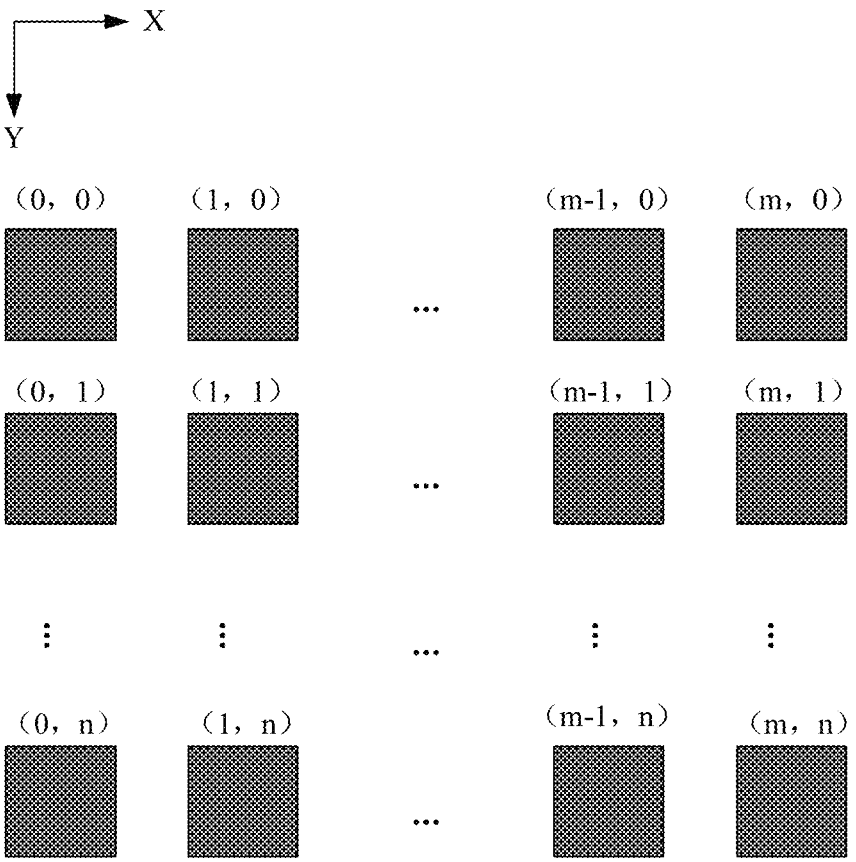
FIG. 8 is a schematic diagram of a correspondence relationship between a pixel unit and coordinates in a display array according to an embodiment of the present disclosure.

Reference is made to FIG. 8. FIG. 8 is a schematic diagram of a correspondence relationship between a pixel unit and coordinates in a display array according to an embodiment of the present disclosure. In this case, the display array is configured with m+1 columns and n+1 rows of pixel units, n and m are all positive integers. The plane where the display array is located is determined as the XY plane of a rectangular coordinate system, and the coordinates of the pixel unit in the i-th column and the j-th row in the XY plane is set as (i−1, j−1). In this case, the coordinates of the pixel unit in the first column and first row is (0, 0), and the coordinates of the pixel unit in (m+1)-th column and (n+1)-th row is (m, n), where i is a positive integer no greater than m+1, and j is a positive integer no greater than n+1. The coordinates of the pixel unit may represent the center position of the pixel unit.

Figure 9:
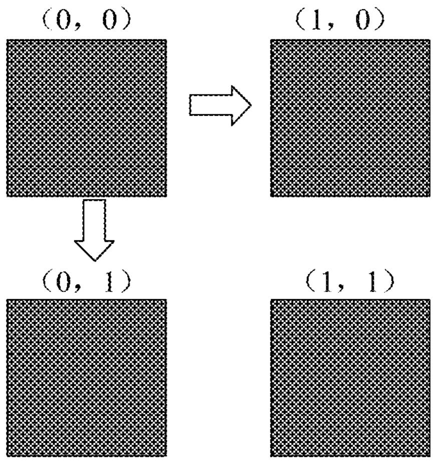
FIG. 9 is a schematic diagram of a principle of dividing a display array into multiple regions according to an embodiment of the present disclosure.
Figure 10:
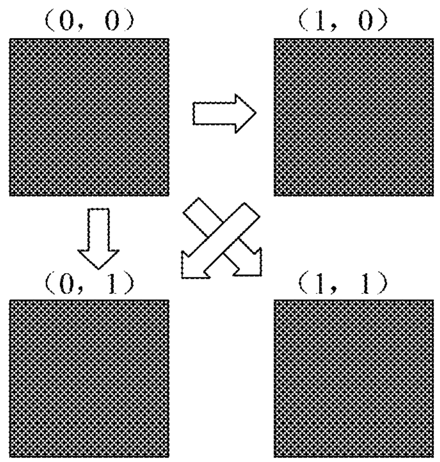
FIG. 10 is a schematic diagram of a principle of dividing a display array into multiple regions according to an embodiment of the present disclosure.

According to the relationship between the pixel unit and the coordinate system shown in FIG. 8, the principle of dividing the display array into multiple regions may be shown in FIG. 9 or FIG. 10. In FIGS. 8 and 9, a rectangular shade-filled block represents a pixel unit in the display array, and the arrow represents the first direction.

Reference is made to FIG. 9. FIG. 9 is a schematic diagram of a principle of dividing a display array into multiple regions according to an embodiment of the present disclosure. In this method, the first direction includes the row direction and the column direction of the array. The pixel unit at the (0, 0) position is determined as an initial reference pixel. The R, G, and B of the initial reference pixel are compared with that of adjacent pixel unit (1, 0) located to the right of the initial reference pixel. And the R, G, and B of the initial reference pixel are compared with that of adjacent pixel unit right (0, 1) located below the initial reference pixel. In a case that the to-be-displayed data of two adjacent pixel units are the same, the two adjacent pixel units are divided into the region 1. In a case that the to-be-displayed data of two adjacent pixel units are different, a new region is added, and the pixel unit with different to-be-displayed data from the initial reference pixel may be divided into the new region. In this case, this pixel unit is determined as a new reference pixel. The comparisons of to-be-displayed data of adjacent pixel units are continued until the comparisons of the to-be-displayed data of all pixel units in the pixel array are completed. For two adjacent regions, in a case that the number of pixel units in each region is less than a set number, the two regions may be merged and they are in the same sub-display-area.

When the number of the pixel units in multiple consecutive regions is less than the set number, the multiple consecutive regions may be merged and they are in the same sub-display-area. When the number of the pixel units in a region is less than the set number, and the pixel units in the surrounding adjacent regions are not less than the set number, the region may be configured as a sub-display-area. Or the region and the adjacent region with the minimum number may be merged into a sub-display-area.

Reference is made to FIG. 10. FIG. 10 is a schematic diagram of a principle of dividing a display array into multiple regions according to an embodiment of the present disclosure. In this method, the first direction includes the row direction and the column direction of the array, and further includes two diagonal directions. Based on the method shown in FIG. 9, the method shown in FIG. 10 not only compares the to-be-displayed data of two adjacent pixel units in the row direction and column direction, but also compares the to-be-displayed data of two adjacent pixel units in the two diagonal directions of the display array.

Figure 11:
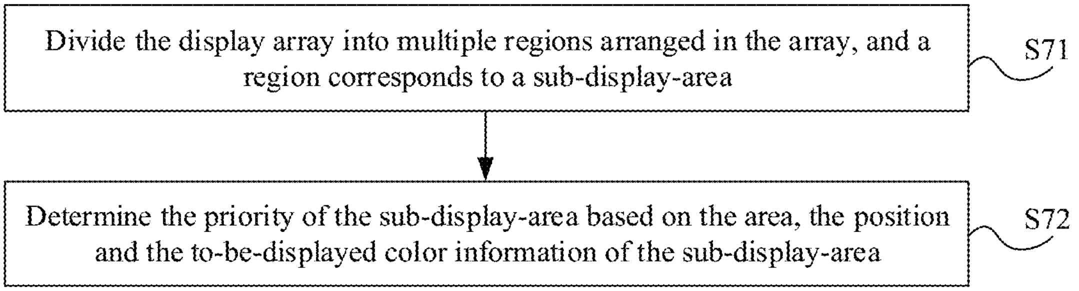
FIG. 11 is a schematic flowchart of a method for dividing a display array into multiple regions according to another embodiment of the present disclosure.

In other embodiments, the above method for dividing the display array into multiple regions based on the to-be-displayed data in each pixel unit may further be shown in FIG. 11.

Reference is made to FIG. 11. FIG. 11 is a schematic flowchart of a method for dividing a display array into multiple regions according to another embodiment of the present disclosure. The method includes steps S71 and S72 as follows.

In step S71, the display array is divided into multiple regions arranged in the array, and one region corresponds to one sub-display-area.

The to-be-displayed data of each pixel unit in the display array may be obtained through the pre-display screen signal, to divide the display array into multiple regions arranged in the array. In an embodiment, the display array may be first divided into multiple strip areas arranged in parallel in the row direction of the display array. Then, the multiple strip areas arranged in parallel may be divided into multiple regions arranged in the array in the column direction of the display array. In an embodiment, the display array may be divided into multiple strip areas arranged in parallel in the column direction of the display array, and then divided into multiple strip areas arranged in parallel in the row direction of the display array.

The widths of different strip regions may be the same. In this case, the display array is divided into multiple same regions. In an embodiment, at least two strip regions with different widths may be included based on the screen information of the to-be-displayed image. For example, the parts in the to-be-displayed image with the same color and brightness in a large area are divided into the same strip region as much as possible.

In step S72, the priority of the sub-display-area is determined based on the area, the position and the to-be-displayed color information of the sub-display-area.

In the method shown in FIG. 11, the display array is divided into multiple regions arranged in an array, and each region is configured as a separate sub-display-area. The priority of the sub-display-area is related to the area, the position and the to-be-displayed color information of the sub-display-area. As described below, the priority of each sub-display-area may be determined by setting different weight coefficients for the area, the position and the to-be-displayed color information of the sub-display-area. This method can be applied in scenarios of full-screen display video. The position of the sub-display-area is set to have a largest weight coefficient, and the sub-display-area closer to the center of the display array has a higher priority, and the sub-display-area farther away from the center of the display array has a lower priority. In this way, an actual display image of the sub-display-area close to the center region of the display array has a minor deviation from the to-be-displayed data. The display brightness and/or resolution of the peripheral regions around the display array may be compromised to reduce the power consumption for display.

Figure 12:
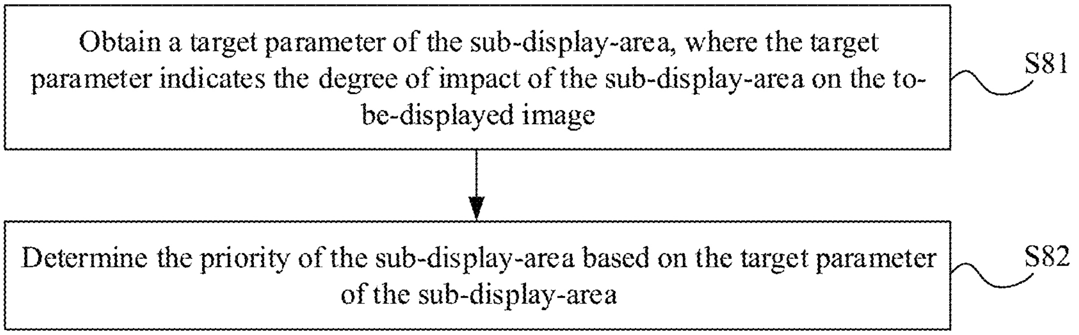
FIG. 12 is a flowchart of a method for determining a priority of a sub-display-area according to an embodiment of the present disclosure.

Reference is made to FIG. 12. FIG. 12 is a flowchart of a method for determining a priority of a sub-display-area according to an embodiment of the present disclosure. The method includes steps S81 and S82 as follows.

In step S81, a target parameter of the sub-display-area is obtained, where target parameters may indicate the degree of impact of the sub-display-area on the to-be-displayed image.

When the target parameters of the two sub-display-areas have the same degree of impact on the to-be-displayed image, the two have the same priority. On the contrary, in a case that the target parameters of the two sub-display-areas have different degrees of impact on the to-be-displayed image, the two have different priorities. As described above, the priority is positively correlated with the degree of impact.

In step S82, the priority of the sub-display-area is determined based on the target parameter of the sub-display-area.

The target parameter includes at least one of the area of the sub-display-area, the position of the sub-display-area, and the to-be-displayed color information of the sub-display-area.

In the method shown in FIG. 12, the priority of the sub-display-area can be determined based on the target parameter(s) of the sub-display-area. Then the pixel units in the sub-display-area are controlled for image display based on the priority of each sub-display-area. In this way, the power consumption for display of the display panel can be reduced while ensuring the important screen information in the to-be-displayed image to a great extent.

In one embodiment, the process of determining the priority of the sub-display-area is described. As an example, the target parameters include the area, the position, and the to-be-displayed color information of the sub-display-area. In an embodiment, the priority of the sub-display-area may be determined based on the requirements for image display effect, based on any one or two of the area, the position, and the to-be-displayed color information of the sub-display-area, which is not limited in the embodiments of the present disclosure.

In one embodiment of the present disclosure, the priority of the sub-display-area is determined based on the area, the position, and the to-be-displayed color information of the sub-display-area. The area of the sub-display-area may represent the proportion of the area of the sub-display-area relative to the overall area of the display array. The position of the sub-display-area may represent the distance between the center position of the sub-display-area relative to the center position of the display array. The to-be-displayed color information of the sub-display-area may represent the color richness of each pixel unit in the sub-display-area when displaying an image based on the to-be-displayed data.

In one embodiment, the method for determining the priority of the sub-display-area based on the target parameter includes:

- determining whether a distance between the center of the sub-display-area and the center of the display area is less than a first distance threshold to obtain a first determination result;
- determining whether the ratio of the number of pixel units in the sub-display-area to the number of pixel units in the display array is greater than a first quantity ratio to obtain a second determination result;
- determining whether the number of colors displayed in the sub-display-area when displaying an image based on the to-be-displayed data is greater than a first color quantity threshold to obtain a third determination result;
- determining the priority of the sub-display-area based on the first determination result, the second determination result and the third determination result;
- where the display panel is configured with a first priority to an eighth priority; different priorities correspond to different combinations of the three determination results.

For the same sub-display-area, each of the first determination result, the second determination result and the third determination result may be a result of two types, i.e., “yes” or “no”. In this case, three determination results lead to a total of 2*2*2 combination modes, which corresponds to eight priorities. Eight combination modes may be set based on requirements, and each combination mode corresponds to a different priority. In this way, the power consumption for display of the display panel is reduced while ensuring the important screen information in the to-be-displayed image to the greatest extent.

In one embodiment, in a case that the first determination result, the second determination result and the third determination result are all “yes”, the priority is the first priority. In a case that the first determination result and the second determination result are all “yes”, the priority is the first priority when the third determination result is “yes”, otherwise the priority is the second priority. In a case that the first determination result is “yes” and the second determination result is “no”, the priority is the third priority when the third determination result is “yes”, otherwise the priority is the fourth priority. In a case that the first determination result is "no", the second determination result is "yes", the priority is the fifth priority when the third determination result is "yes", otherwise the priority is the sixth priority. In a case that the first determination result and the second determination result are both "no", the priority is the seventh priority when the third determination result is "yes", otherwise the priority is the eighth priority. In this case, the method for determining the priority of the sub-display-area may be shown in FIG. 13.

Figure 13:
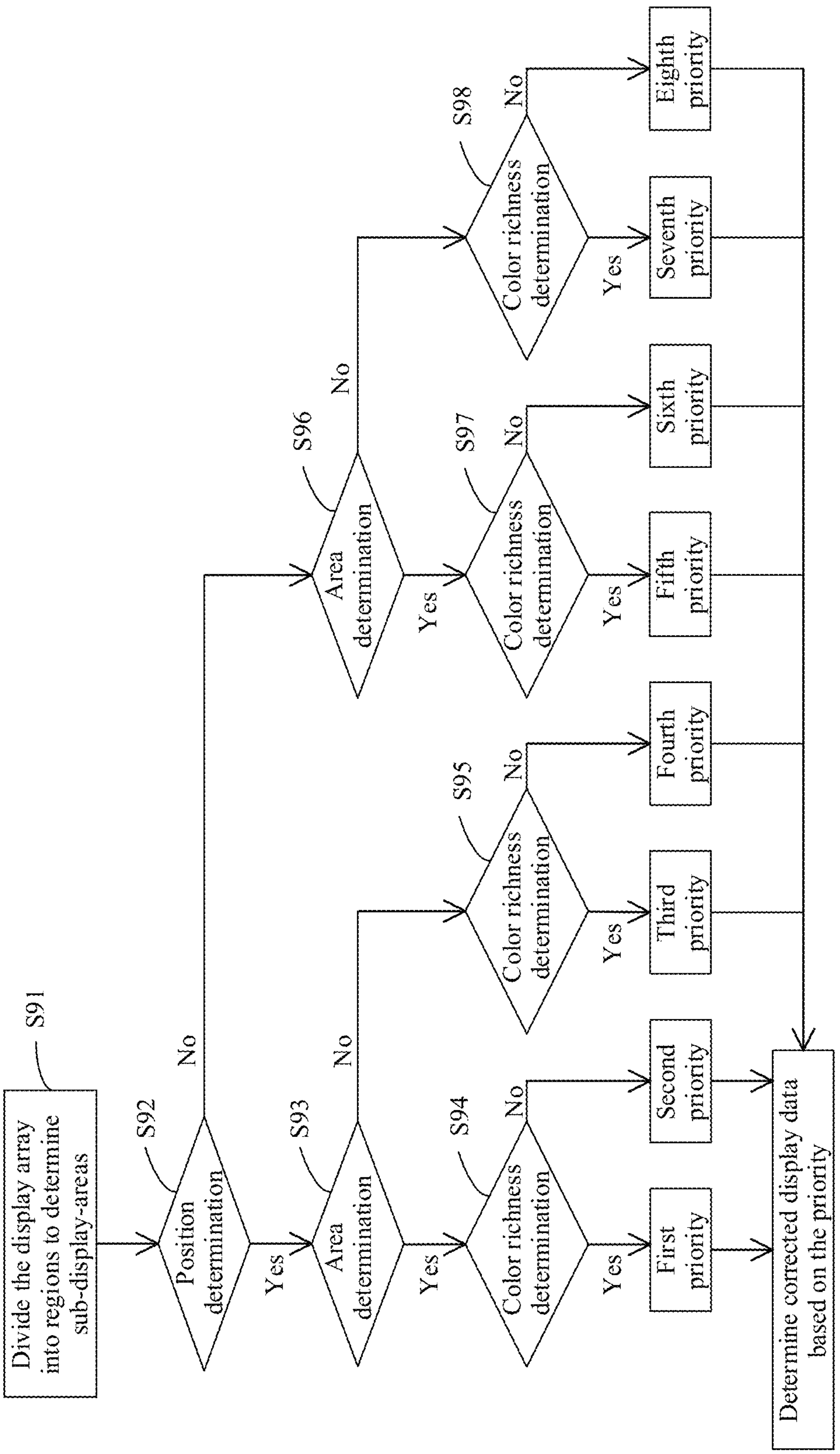
FIG. 13 is a flowchart of a method for determining a priority of a sub-display-area according to an embodiment of the present disclosure.

Reference is made to FIG. 13. FIG. 13 is a flowchart of a method for determining a priority of a sub-display-area according to an embodiment of the present disclosure. The method includes steps S91 to S98 as follows.

In step S91, the display array is divided into regions to determine sub-display-areas. The method for dividing the display array into multiple regions and determining multiple sub-display-areas based on the regions may refer to the above description, which will not be repeated again.

In step S92, after the display array is divided into multiple sub-display-areas, the process of position determination is performed: whether the distance between the center of the sub-display-area and the center of the display array is less than the first distance threshold is determined. In a case of "yes" (i.e. the first determination result is "yes"), it proceeds to the step S93; in a case of "no" (i.e. the first determination result is "no"), it is proceeds to the step S96.

In step S93, the process of area determination is performed: whether the number of pixel units in the sub-display-area relative to the number of pixel units in the display array is greater than the first quantity ratio is determined. In a case of "yes" (i.e. the second determination result is "yes"), it proceeds to the step S94; in a case of "no" (i.e. the second determination result is "no"), it proceeds to the step S95.

In step S94, the process of color richness determination is performed: whether the number of colors displayed in the sub-display-area when displaying the image based on the to-be-displayed data is greater than the first color threshold is determined. In a case of "yes" (i.e. the third determination result is "yes"), then the priority of the sub-display-area is the first priority; in a case of "no" (i.e. the third determination result is "no"), then the priority of the sub-display-area is the second priority. In this method, in a case that the first determination result, the second determination result and the third determination result are all "yes", the priority of the corresponding sub-display-area is the first priority; in a case that only the third determination result is "no", the priority of the corresponding sub-display-area is the second priority.

In step S95, when the determination result of the step S93 is "no", whether the number of colors displayed in the sub-display-area when displaying the image based on the to-be-displayed data is greater than the first color threshold is determined through the process of color richness determination. In a case of "yes" (i.e. the third determination result is "yes"), then the priority of the sub-display-area is the third priority; in a case of "no" (i.e. the third determination result is "no"), then the priority of the sub-display-area is the fourth priority. In this method, in a case that only the second determination result is "no" among the first determination result, the second determination result and the third determination result, then the priority of the sub-display-area is the third priority; in a case that only the first determination result is "yes", then the priority of the sub-display-area is the fourth priority.

In step S96, when the determination result of the step S92 is "no", whether the number of pixel units in the sub-display-area relative to the number of pixel units in the display array is greater than the first quantity ratio is determined through the process of area determination. In a case of "yes" (i.e. the second determination result is "yes"), it proceeds to the step S97; in a case of "no" (i.e. the second determination result is "no"), it proceeds to the step S98.

In step S97, whether the number of colors displayed in the sub-display-area when displaying the image based on the to-be-displayed data is greater than the first color threshold is determined through the process of color richness determination. In a case of "yes" (i.e. the third determination result is "yes"), then the priority of the sub-display-area is the fifth priority; in a case of "no" (the third determination result is "no"), then the priority of the sub-display-area is the sixth priority. In this method, in a case that only the first determination result is "no" among the first determination result, the second determination result and the third determination result, then the priority of the sub-display-area is the fifth priority; in a case that only the second determination result is "yes", then the priority of the sub-display-area is the sixth priority.

In step S98, whether the number of colors displayed in the sub-display-area when displaying the image based on the to-be-displayed data is greater than the first color threshold is determined through the process of color richness determination. In a case of "yes" (i.e. the third determination result is "yes"), then the priority of the sub-display-area is the seventh priority; in a case of "no" (i.e. the third determination result is "no"), then the priority of the sub-display-area is the eighth priority. In this method, in a case that only the third determination result is "yes" among the first determination result, the second determination result and the third determination result, the priority of the sub-display-area is the seventh priority; in a case that the first determination result, the second determination result and the third determination result are all "no", the priority of the sub-display-area is the eighth priority.

Finally, the corrected display data required for each sub-display-area is determined based on the priority of each sub-display-area.

In the method shown in FIG. 13, the sub-display array is divided into multiple sub-display-areas based on the region division result of the display array. The priority of each sub-display-area may be determined based on the position, the area size and the color richness of each sub-display-area. The position, area size, and color richness of each sub-display-area may be determined in sequence according to importance, to divide the sub-display-areas into corresponding priorities.

The relative position of the sub-display-area relative to the center of the display array may be determined based on position determination. The closer the position of the sub-display-area to the center, the more significant the sub-display-area is. The area size of the sub-display-area may be determined based on area determination. The area size of the sub-display-area may be represented by the ratio of the number of pixel units contained in the sub-display-area to the total number (m*n) of pixel units in the display array. The smaller the area of the sub-display-area is, the more significant the sub-display-area is. The required color richness degree for displaying in the sub-display-area may be determined based on the color richness degree. As described above, the color richness of the region may be obtained according to how many regions with the same color are merged into the sub-display-area. The more small regions merged into the sub-display-area, the higher the color richness is, and otherwise the lower the color richness is. The richer the color of the sub-display-area is, the more significant the sub-display-area is.

When determining the priority of the sub-display-area based on the position determination, area determination and color richness determination, it includes but is not limited to eight priorities. For example, the position determination, the area determination and the color richness determination all may classify more levels of criteria. The display of each priority may be pre-processed. For example, the overall brightness and light-emitting pixels remain normal in the first priority. Each priority may be configured to reduce the overall brightness or turn off some pixel units from the second priority to the eighth priority. The reduction of the overall brightness and the number of light-emitting pixel units that are turned off may be configured according to the actual calibration effect, to reduce the power consumption for display while retaining the key screen information obtained by the human eyes.

Based on the display requirements, the first determination result, the second determination result and the third determination result are configured to correspond to eight combination modes, which is from the first priority to the eighth priority in a high to low order. The priorities and the combination modes for determination results are not limited to the embodiment shown in FIG. 13.

In the method for driving display according to the embodiment of the present disclosure, the weight of the sub-display-area may be determined based on the target parameter of the sub-display-area. Subsequently, the priority of the sub-display-area may be determined based on the weight of the sub-display-area.

When determining the priority of the sub-display-area based on the weight of the sub-display-area, the weight of the sub-display-area may be determined by combining the corresponding weight coefficients of the area, the position and the to-be-displayed color information of the sub-display-area. The priority of the sub-display-area may then be determined. This method can reduce the power consumption for display of the display panel through compromising the display brightness of the sub-display-area with a low priority.

When determining the position of the sub-display-area based on the weight of the sub-display-area, the method for determining the priority of the sub-display-area may include: determining a relative position level of the sub-display-area based on the center distance between the sub-display-area and the display array, different relative position levels correspond to different first weight coefficients; determining an area level of the sub-display-area based on the quantity ratio of the number of pixel units in the sub-display-area to the number of pixel units in the display array, and different area levels correspond to different second weight coefficients; determining a to-be-displayed color information level of the sub-display-area based on the number of colors displayed in the sub-display-area when displaying the image based on the to-be-displayed data, different to-be-displayed color information levels correspond to different third weight coefficients; calculating the weight of the sub-display-area based on the three weight coefficients of the sub-display-area; determining the priority of the sub-display-area based on the weight of the sub-display-area. The higher the priority is, the greater the weight is. On the contrary, the lower the priority is, the lesser the weight is.

The center distance between the sub-display-area and the display array is the distance between the center of the sub-display-area and the center of the display array. In a case that the sub-display-area is an irregular shape, the above center distance is defined by using the center of gravity of the sub-display-area as the center of the sub-display-area.

According to the embodiment of the present disclosure, the priority of the sub-display-area is determined based on the weight of the sub-display-area. The sub-display-area is controlled for image display based on the priority corresponding to the sub-display-area. In this way, the power consumption for display of the display panel is reduced while retaining the important screen information in the to-be-displayed image.

Different priorities may be preset to correspond to different weight ranges, and the weight ranges of different priorities do not overlap with each other. After determining the weight of the sub-display-area, the priority may be determined based on the weight range where the weight falls. In a case that the weights of the two sub-display-areas are in the same weight range, the two sub-display-areas have the same priority. In a case that the weights of the two sub-display-areas are in different weight ranges, the two sub-display-areas have different priorities.

In an implementation of the embodiments of the present disclosure, the weight of the sub-display-area is calculated based on the three weight coefficients of the sub-display-area. The calculation equation includes as follows:

$$W = \frac{a * W_1 + b * W_2 + c * W_3}{d} \tag{1}$$

$$\text{or, } W = W * W_3 * W_3 \tag{2}$$

where W is the weight of the sub-display-area, $W_1$ is the first weight coefficient, $W_2$ is the second weight coefficient, $W_3$ is the third weight coefficient, and a, b, c, and d are all set constants.

In an embodiment of the present disclosure, the weight corresponding to the sub-display-area may be calculated based on the above equation (1) or the above equation (2), and the priority of the sub-display-area is determined based on the weight of the sub-display-area.

In an embodiment, the display array is divided into multiple sub-arrays arranged in an array, and the sub-arrays have multiple pixel units. The sub-arrays are provided with corresponding first weight coefficients, and the first weight coefficients are negatively correlated with the center distance between the sub-array and the display array. The greater the center distance is, the smaller the first weight coefficient is. On the contrary, the lesser the center distance is, the greater the first weight coefficient is. The same center distance corresponds to the same first weight coefficient. In this case, the method for determining the relative position level includes: determining the position level of the sub-display-area based on the sub-array where the center of the sub-display-area is located. In an embodiment, the first weight coefficient of the sub-display-area is equal to the first weight coefficient corresponding to the sub-array located in the center of the sub-display-area. The first weight coefficient corresponding to the sub-array located in the center of the display array may be set to 1, and the first weight coefficients corresponding to other sub-arrays are all positive numbers less than 1. The number of sub-arrays and the division method may be set based on requirements, and the first weight coefficient corresponding to each sub-array may be set according to requirements. The number of sub-arrays and the first weight corresponding to each sub-array are not limited in the embodiments of the present disclosure.

Figure 14:
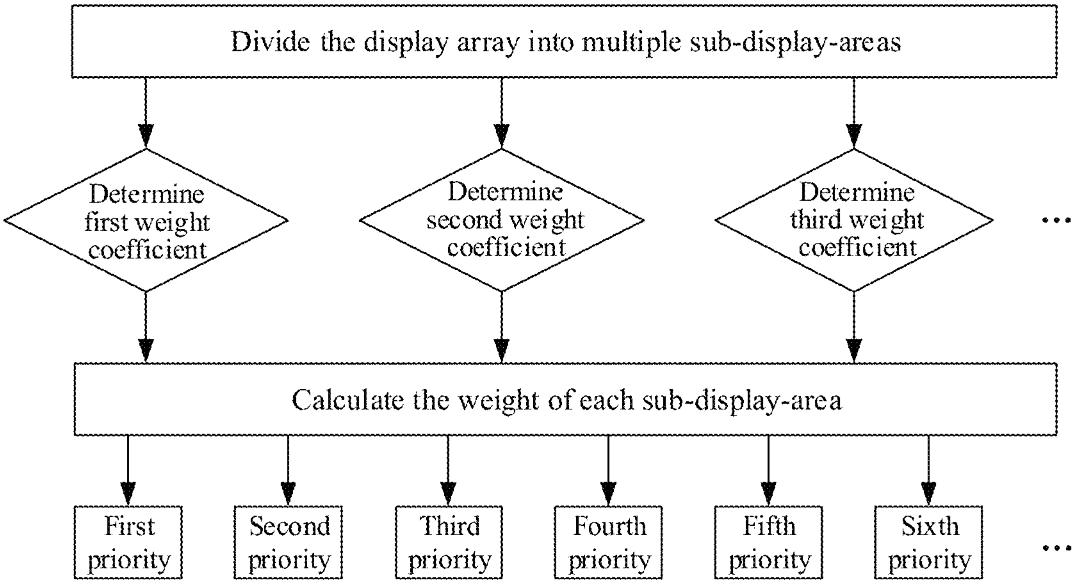
FIG. 14 is a schematic diagram of a principle for determining a priority of a sub-display-area according to an embodiment of the present disclosure.

Reference is made to FIG. 14. FIG. 14 is a schematic diagram of a principle for determining a priority of a sub-display-area according to an embodiment of the present disclosure. After the display array is divided into multiple sub-display-areas, the first weight coefficient determination, the second weight coefficient and the third weight coefficient determination are performed simultaneously to determine the first weight coefficients, the second weight coefficients and the third weight coefficients of the sub-display-areas. The weight of each of the sub-display-areas is calculated based on the first weight coefficient, the second weight coefficient and the third weight coefficient. The priority is then determined based on the weight of the sub-display-area.

The first weight coefficient may indicate the position of the sub-display-area. The second weight coefficient may indicate the area of the sub-display-area. The third weight coefficient may indicate the richness of colors required for displaying in the sub-display-area. This method can determine the weight of the sub-display-area by determining the position, size, color richness of each sub-display-area, and determine the priority based on the weight of the sub-display-area. In addition, this method can set the highest priority to keep the overall brightness and light-emitting pixels normal, the non-highest priority to reduce the overall brightness or turn off some pixel units. The reduction of the overall brightness and the number of light-emitting pixel units that are turned off may be configured according to the actual calibration effect, to reduce the power consumption for display while retaining the key screen information obtained by the human eyes.

In the method shown in FIG. 14, the closer the position of the sub-display-area to the center, the more significant the sub-display-area is; the smaller the area of the sub-display-area is, the more significant this sub-display-area is; and the richer the color of the sub-display-area, the more significant this sub-display-area is.

Figure 15:
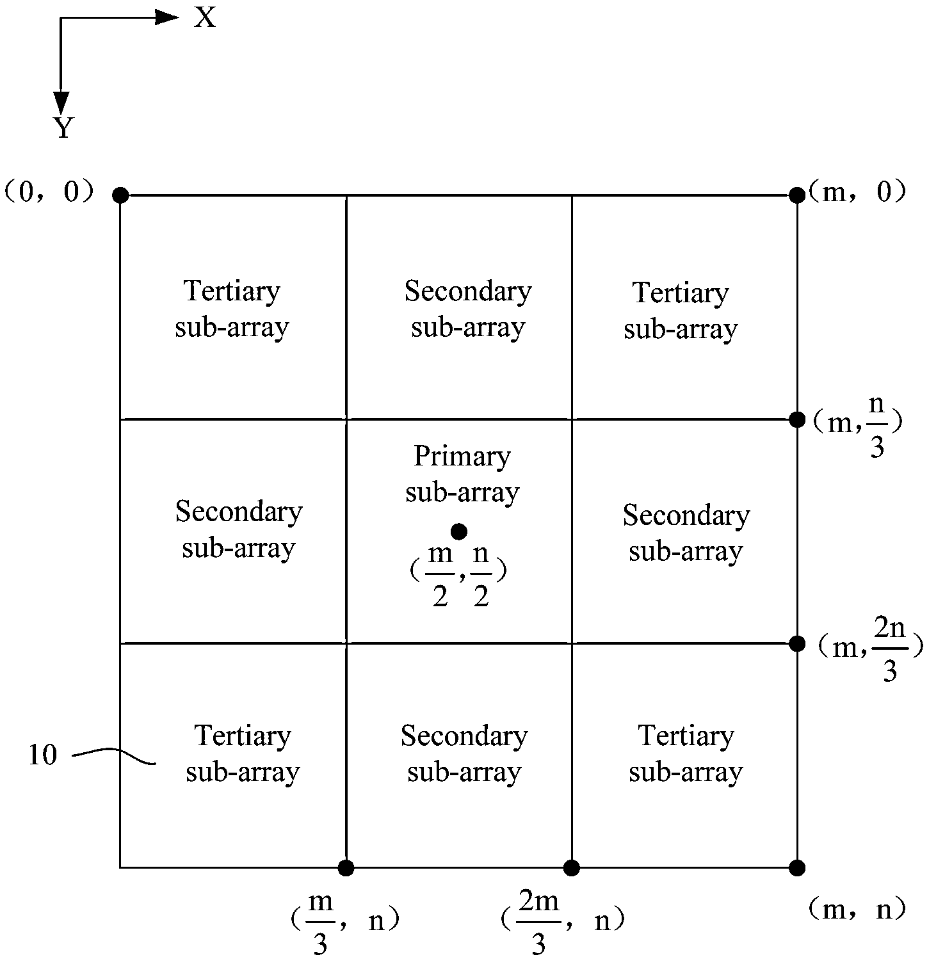
FIG. 15 is a schematic diagram of a principle of determining a first weight coefficient corresponding to a sub-display-area according to an embodiment of the present disclosure.

Reference is made to FIG. 15. FIG. 15 is a schematic diagram of a principle of determining a first weight coefficient corresponding to a sub-display-area according to an embodiment of the present disclosure. The display array is divided into sub-arrays 10 of three rows and three columns. Each sub-array 10 includes multiple pixel units. In the XY plane, the center coordinates of the display array are $$\left(\frac{m}{2}, \frac{n}{2}\right),$$

the center coordinates of the pixel unit in the first row and the first column in the display array are the coordinate origin (0, 0), and the center coordinates of the pixel unit in the n-th row and the m-th column in the display array are the coordinate origin (m, n).

In FIG. 15, the sub-array in the second row and the second column is set as a primary sub-array with the largest first weight coefficient. The first weight coefficient of the primary sub-array may be set to 1. The four sub-arrays adjacent to the primary sub-array are all secondary sub-arrays, and the first weight coefficient of the secondary sub-array may be set to 0.66. The four sub-arrays located in top corner regions are all tertiary sub-arrays, and the first weight coefficient of the tertiary sub-array may be set to 0.33.

In order to improve the diversity of the sub-display-area in the method for driving display, before obtaining the to-be-displayed data, the method for driving display further includes: configuring a method for dividing the sub-arrays, and configuring the first weight coefficient corresponding to each sub-array based on the method for dividing the sub-arrays. In other methods, each sub-array may be configured with a fixed first weight coefficient based on a fixed method for dividing the sub-display arrays.

In one embodiment, the first to N-th ratio ranges and the second weight coefficient corresponding to each ratio range are pre-stored. The first to N-th ratio ranges correspond to the first to N-th area levels in sequence, and the second weight coefficient are decreased in sequence; N is a positive integer greater than 1. The method for determining the area level includes: determining the area level of the sub-display-area based on the ratio range where the above quantity ratio is located.

For example, N may be set to 10. When the quantity ratio is less than 10%, it is in the first ratio range; when the quantity ratio is no less than 10% and less than 20%, it is in the second ratio range; when the quantity ratio is no less than 20% and less than 30%, it is in the third ratio range; and so on, until the quantity ratio is no less than 90%, it is in the tenth ratio range. The second weight coefficients corresponding to the first ratio range to the tenth ratio range may be set as 1, 0.9, 0.8, 0.7, 0.6, 0.5, 0.4, 0.3, 0.2, 0.1 in sequence.

In order to improve the diversity of sub-display-area in the method for driving display, before obtaining the to-be-displayed data, the method for driving display further includes: configuring a method for dividing N ratio ranges, and configuring a second weight coefficient corresponding to each ratio range based on the method for dividing N ratio ranges. In other methods, each ratio range may be configured with a fixed second weight coefficient based on the N ratio ranges configured in a fixed method for dividing N ratio ranges.

In one embodiment, the first to Q-th color quantity ranges and the third weight coefficient corresponding to each color quantity range are pre-stored. The first to Q-th color quantity ranges correspond to the first to Q-th to-be-displayed color information levels in sequence, the corresponding third weight coefficient decreases in sequence; Q is a positive integer greater than 1. In this case, the method for determining the to-be-displayed color information level of the sub-display-area includes: determining the to-be-displayed color information level of the sub-display-area according to the color quantity range where the number of colors displayed in the sub-display-area falls when displaying the image based on the to-be-displayed data.

For example, Q may be set to be 4. When the sub-display-area displays the image based on the to-be-displayed data, in a case that the number of colors that can be displayed is no less than 10, it is in the first color quantity range; in a case that the number of colors is no less than 6 and less than 10, it is in the second color quantity range; when the number of colors is no less than 2 and less than 6, it is in the third color quantity range; when the number of colors is equal to 1, it is in the fourth color quantity range. The third weight coefficients corresponding to the first color quantity range to the fourth color quantity range may be set as 1, 0.75, 0.5, and 0.25 in sequence.

In order to improve the diversity of sub-display-area in the method for driving display, before obtaining the to-be-displayed data, the method for driving display further includes: configuring a method for dividing the Q color quantity ranges, and configuring the third weight coefficient corresponding to each color quantity range based on the method for dividing the Q color quantity ranges. In other methods, each color quantity range may also be configured with a fixed third weight coefficient based on the Q color quantity ranges configured in a fixed method for dividing the Q color quantity ranges.

In one embodiment, the weight of the sub-display-area may be calculated based on three weight coefficients to determine the priority of the sub-display-area. Therefore, the weights of different sub-display-areas may be adjusted by configuring values of the three weight coefficients, to adjust the priority ordering of the sub-display-areas.

For example, when the first weight coefficient is the largest, the position of the sub-display-area may be configured as the primary determinant of its priority. This can highlight the importance of the position of the sub-display-area in determining the priority, and the sub-display-area close to the middle area of the display panel has a higher priority to better ensure the display effect of the sub-display-area close to the middle area of the display panel. In an embodiment, when the second weight coefficient is the largest, the area of the sub-display-area may be configured as the first determinant of its priority. This can highlight the importance of the number of pixel units in the sub-display-area in determining the priority, and the sub-display-area with a larger number of pixel units has a greater priority to better ensure the display effect of the sub-display-area with a larger number of pixel units. In an embodiment, when the third weight coefficient is the largest, the to-be-displayed color information of the sub-display-area may be configured as the first determinant of its priority. This can highlight the importance of the required color richness degree for displaying in the sub-display-area in determining the priority, and the sub-display-area required for displaying a greater color richness degree have a greater priority, to better ensure the display effect of the sub-display-area required for displaying the greater color richness degree.

In one embodiment, the method for driving display according to the embodiment of the present disclosure further includes: selecting a display mode of the display panel. The display mode of the display panel includes a first display mode and a second display mode. The first display mode is an energy-saving display mode. In the first display mode, as described above, the display array is divided into at least two sub-display-areas with different priorities. The pixel units in the sub-display-areas are controlled for image display based on the priorities, to reduce the power consumption for display. The second display mode is a normal display mode. In the second display mode, the pixel units in the display array are controlled for image display based on the to-be-displayed data to best display the screen information of the to-be-displayed image.

In each of the above embodiments, the priority of each sub-display-area is determined based on the degree of impact of the sub-display-area on the to-be-displayed image. Based on the priority, the pixel units in the sub-display-area are controlled for image display, to reduce the power consumption for display of the display panel.

In other methods, the priority may be configured to be positively correlated with the distance between the sub-display-area and the edge of the display array; the corrected display data may be configured to enable the pixel units display at the first brightness, and the to-be-displayed data may enable the pixel units display at the second brightness, where the first brightness is greater than the second brightness. In this way, the display brightness in the area close to the edge of the display array can be increased to increase the brilliance of the edge area to prevent other people around the user from peeking at the display content of the display panel.

The display panel has a third mode, and the third mode is an anti-peeping display mode. When the display panel is in the third mode, the display array may be divided into a first sub-display-area and a second sub-display-area surrounding the first sub-display-area. The priority of the first sub-display-area is set to be higher than the priority of the second sub-display-area. In this way, in the third mode, the pixel units in the first sub-display-area is controlled for image display based on the to-be-displayed data, and the pixel units in the second sub-display-area is controlled for image display based on the corrected display data.

Based on the method for driving display according to the above embodiment, a display driver is provided according to another embodiment of the present disclosure, which can execute the method for driving display according to any one of the above embodiments.

The display driver, according to the embodiment of the present disclosure, can implement the above method for driving display, where each sub-display-area is controlled for image display based on the priority of the sub-display-area, and the display panel can provide with multiple display modes, to reduce the power consumption for display of the display panel, or enable anti-peeping display.

Figure 16:
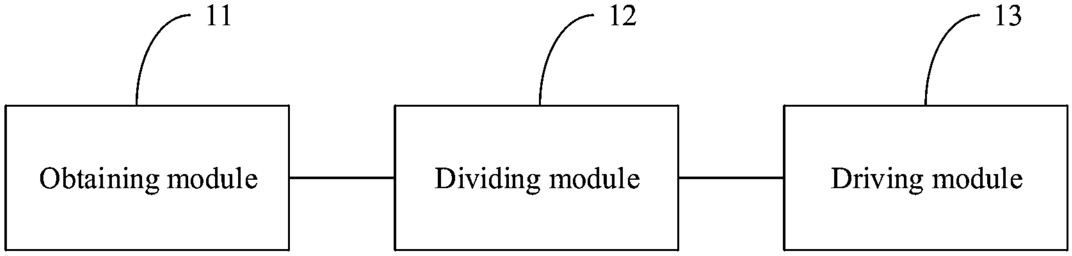
FIG. 16 is a schematic structural diagram of a display driver according to an embodiment of the present disclosure.

Reference is made to FIG. 16. FIG. 16 is a schematic structural diagram of a display driver according to an embodiment of the present disclosure. The display driver includes an obtaining module 11, a dividing module 12, and a driving module 13 as follows.

The obtaining module 11 is configured to obtain to-be-displayed data of pixel units.

The dividing module 12 is configured to divide a display array into at least two sub-display-areas with different priorities based on the to-be-displayed data of each pixel unit; where each sub-display-area includes multiple pixel units arranged consecutively.

The driving module 13 is configured to control the pixel units in the sub-display-area for image display based on the priority; for the sub-display-area with a highest priority, control the pixel units for image display based on the to-be-displayed data; for the sub-display-area with a non-highest priority, control at least part of the pixel units for image display based on corrected display data.

Based on the display driver and the method for driving display according to the above embodiments, an electronic device is provided according to another embodiment of the present disclosure. The electronic device may be as shown in FIG. 17.

Figure 17:
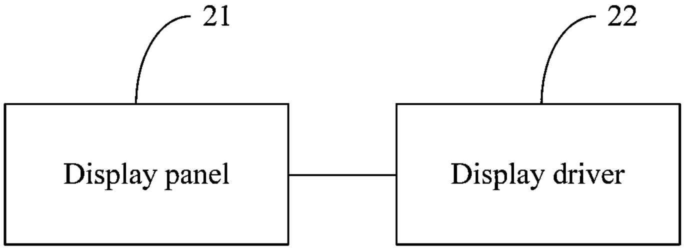
FIG. 17 is a schematic structural diagram of an electronic device according to an embodiment of the present disclosure.

Reference is made to FIG. 17. FIG. 17 is a schematic structural diagram of an electronic device according to an embodiment of the present disclosure. The electronic device includes a display panel 21 and a display driver 22. The display driver 22 can control the display panel 21 for image display based on the method for driving display provided according to any one of the above embodiments. The display driver 22 may be as shown in FIG. 16.

In one embodiment, the electronic device may be a display device such as a mobile phone, a computer, a smart wearable device, and the like.

The electronic device, according to the embodiment of the present disclosure, can implement the above method for driving display via the display driver 22, which can control each sub-display-area for image display based on the priority of the sub-display-area, and can provide the display panel 21 with multiple display modes, to reduce the power consumption for display of the display panel 21 or to enable anti-peeping display.

Distinguishing from the conventional method for driving display in which all pixel units have to-be-displayed data for image display, in the method for driving display provided by the technical solutions of the present disclosure, each sub-display-area is controlled for image display based on the priority of the sub-display-area. For the sub-display-area with the highest priority, the pixel units are controlled to faithfully reproduce based on the to-be-displayed data, to faithfully reproduce the screen information corresponding to the to-be-displayed data. For the sub-display-area with non-highest priority, a part of pixel units are controlled to perform non-faithful reproduction based on the corrected display data that is different from the to-be-displayed data, the screen information corresponding to the corrected display data is displayed, and the screen information corresponding to the to-be-displayed data may not be reproduced. With the method for driving display provided by the technical solutions of the present disclosure, based on the priority of the sub-display-area, the pixel units can be controlled for image display based on the to-be-displayed data, or be controlled for image display based on the corrected display data, which can provide diversified display modes.

Each embodiment in this specification is described in a progressive, parallel, or combination of progressive and parallel manner. Each embodiment places emphasis on the difference from other embodiments. One embodiment can refer to other embodiments for the same or similar parts.

It should be noted that, in the description of the present disclosure, it should be understood that the description of the drawings and embodiments is illustrative rather than restrictive. The same reference numerals throughout the description of the embodiments identify similar structures. In addition, the drawings may exaggerate the thickness of some layers, films, panels, areas, and the like, for purposes of understanding and ease of description. It will be understood that when an element such as a layer, film, area or substrate is referred to as being "on" another element, the element can be directly on the other element or intervening elements may be present. In addition, "on" refers to positioning an element above or below another element, but does not essentially mean positioning above the upper side of another element in the direction of gravity.

The orientation or positional relationship indicated by the terms "upper", "lower", "top", "bottom", "inner", "outer" and the like are based on the orientation or positional relationship shown in the drawings, are only for the convenience of describing the present disclosure and simplified description, rather than indicating or implying that the device or element referred to must have a specific orientation, be constructed and operated in a specific orientation, and therefore cannot be construed as a limitation on the present disclosure. When a component is said to be "connected" to another component, it may be directly connected to the other component or there may be an intermediate component between them.

It should be noted that, the relationship terms such as "first", "second" and the like are only used herein to distinguish one entity or operation from another, rather than to necessitate or imply that an actual relationship or order exists between the entities or operations. Furthermore, the terms such as "include", "comprise" or any other variants thereof means to be non-exclusive. Therefore, a process, a method, an article or a device including a series of elements include not only the disclosed elements but also other elements that are not clearly enumerated, or further include inherent elements of the process, the method, the article or the device. Unless expressively limited, the statement "including a . . . " does not exclude the case that other similar elements may exist in the process, the method, the article or the device other than enumerated elements.

The invention claimed is:

1. A method for driving display of a display panel, wherein the display panel comprises a display array for displaying an image, the display array comprises a plurality of pixel units arranged in an array, the method comprises:

obtaining to-be-displayed data of the pixel units;

dividing the display array into at least two sub-display-areas with different priorities based on the to-be-displayed data of each of the plurality of pixel units, wherein each sub-display-area comprises a plurality of pixel units arranged consecutively; and controlling the pixel units in each sub-display-area for image display based on the priority, comprising:

controlling, for a sub-display-area with a highest priority in the at least two sub-display-areas, the pixel units for image display based on the to-be-displayed data;

controlling, for a sub-display-area with a non-highest priority in the at least two sub-display-areas, at least part of the pixel units for image display based on corrected display data.

2. The method according to claim 1, wherein the corrected display data is configured to enable the pixel units to display at a first brightness, the to-be-displayed data is configured to enable the pixel units to display at a second brightness, wherein the first brightness is less than the second brightness.

3. The method according to claim 2, wherein a difference between the second brightness and the first brightness for the sub-display-area with the non-highest priority is negatively correlated with the priority of the sub-display-area.

4. The method according to claim 2, further comprising:

scaling down, for the sub-display-area with the non-highest priority, the to-be-displayed data of the pixel units in a same sub-display-area based on a same proportional coefficient to obtain the corrected display data; and controlling the pixel units for image display based on the corrected display data; or controlling, for the sub-display-area with the non-highest priority, at least part of the pixel units for image display based on the corrected display data, wherein the corrected display data is preset low-grayscale display data.

5. The method according to claim 4, wherein the controlling the pixel units for image display based on the corrected display data comprises:

scaling down the to-be-displayed data of the pixel units in a same sub-display-area based on the same proportional coefficient which is pre-stored to obtain the corrected display data; and controlling the pixel units in the sub-display-area for image display based on the corrected display data;

wherein the proportional coefficient is negatively correlated with the priority of the sub-display-area.

6. The method according to claim 5, wherein a first color quantity range to a Q-th color quantity range and the third weight coefficient corresponding to each color quantity range are pre-stored; the first color quantity range to the Q-th color quantity range correspond to a first to-be-displayed color information level to a Qth to-be-displayed color information level in sequence, the third weight coefficients are decreased in sequence; Q is a positive integer greater than 1;

the determining the to-be-displayed color information level of the sub-display-area comprises:

determining the to-be-displayed color information level of the sub-display-area according to the color quantity range where the number of colors displayed in the sub-display-area falls when displaying the image based on the to-be-displayed data.

7. The method according to claim 4, wherein the controlling, for the sub-display-area with the non-highest priority, at least part of the pixel units for image display based on corrected display data comprises:

obtaining the low-grayscale display data to determine the corrected display data;

controlling, for the same sub-display-area, a part of the pixel units for image display based on the to-be-displayed data, and another part of the pixel units for image display based on the corrected display data;

wherein a proportion of the number of pixel units for image display based on the corrected display data in the sub-display-area is negatively correlated with the priority of the sub-display-area.

8. The method according to claim 4, wherein a same priority corresponds to the same low-grayscale display data;

different priorities correspond to the same low-grayscale display data; or different priorities correspond to different low-grayscale display data, and the priority is positively correlated with the low-grayscale display data.

9. The method according to claim 2, wherein the dividing the display array into at least two sub-display-areas with different priorities based on the to-be-displayed data of each of the plurality of pixel units comprises:

dividing the display array into a plurality of regions based on the to-be-displayed data of each of the plurality of pixel units, wherein the pixel units with different to-be-displayed data are located in different regions, the pixel units with the same to-be-displayed data and adjacent in a first direction are located in a same region, the first direction at least comprises a row direction and a column direction of the array;

determining a plurality of sub-display-areas based on the regions; wherein the region with no less than a set number of pixel units is individually configured as a sub-display-area; the regions, that are adjacent in the first direction and each of which has less than the set number of pixel units, are located in a same sub-display-area; and determining the priority of the sub-display-area based on an area of the sub-display-area, a position of the sub-display-area and to-be-displayed color information of the sub-display-area.

10. The method according to claim 9, wherein each pixel unit comprises a plurality of sub-pixels with different light-emitting colors;

sub-pixels of at least one light-emitting color in two pixel units with different to-be-displayed data correspond to different to-be-displayed data; and sub-pixels of a same light-emitting color in two pixel units with the same to-be-displayed data correspond to the same to-be-displayed data.

11. The method according to claim 9, wherein the dividing the display array into the plurality of regions based on the to-be-displayed data of each of the plurality of pixel units comprises:

determining a pixel unit in the display array as a reference pixel;

dividing, for a pixel unit adjacent to the reference pixel in the first direction, the pixel unit and the reference pixel into a same region in a case that the pixel unit and the reference pixel have the same to-be-displayed data; determining the pixel unit as a new reference pixel in a case that the pixel unit and the reference pixel have different to-be-displayed data; and dividing new regions based on the new reference pixel until all pixel units are divided into corresponding regions.

12. The method according to claim 9, wherein the dividing the display array into the plurality of regions based on the to-be-displayed data of each of the plurality of pixel units comprises:

dividing the display array into the plurality of regions arranged in an array, wherein one region corresponds to one sub-display-area; and determining the priority of the sub-display-area based on the area of the sub-display-area, the position of the sub-display-area, and the to-be-displayed color information of the sub-display-area.

13. The method according to claim 2, wherein the determining the priority of the sub-display-area comprises:

obtaining a target parameter of the sub-display-area, wherein the target parameter indicates a degree of impact of the sub-display-area on a to-be-displayed image; and determining the priority of the sub-display-area based on the target parameter of the sub-display-area;

wherein the target parameter comprises at least one of the area of the sub-display-area, the position of the sub-display-area, and the to-be-displayed color information of the sub-display-area.

14. The method according to claim 13, wherein the determining the priority of the sub-display-area comprises:

determining whether a distance between a center of the sub-display-area and a center of the display array is less than a first distance threshold to obtain a first determination result;

determining whether a ratio of the number of pixel units in the sub-display-area to the number of pixel units in the display array is greater than a first quantity ratio to obtain a second determination result;

determining whether the number of colors displayed in the sub-display-area when displaying the image based on the to-be-displayed data is greater than a first color quantity threshold to obtain a third determination result; and determining the priority of the sub-display-area based on the first determination result, the second determination result, and the third determination result;

wherein the display panel is provided with a first priority to an eighth priority; the different priorities correspond to different combinations of the three determination results.

15. The method according to claim 14, further comprising:

determining that the priority is the first priority, in a case that the third determination result is yes when the first determination result and the second determination result are both yes;

determining that the priority is a second priority, in a case that the third determination result is no when the first determination result and the second determination result are both yes;

determining that the priority is a third priority, in a case that the third determination result is yes when the first determination result is yes and the second determination result is no;

determining that the priority is a fourth priority, in a case that the third determination result is no when the first determination result is yes and the second determination result is no;

determining that the priority is a fifth priority, in a case that the third determination result is yes when the first determination result is no, the second determination result is yes;

determining that the priority is a sixth priority, in a case that the third determination result is no when the first determination result is no, the second determination result is yes;

determining that the priority is a seventh priority, in a case that the third determination result is yes when the first determination result and the second determination result are both no; and determining that the priority is the eighth priority, in a case that the third determination result is no when the first determination result and the second determination result are both no.

16. The method according to claim 13, wherein the determining the priority of the sub-display-area comprises:

determining a relative position level of the sub-display-area based on a center distance between the sub-display-area and the display array, wherein different relative position levels correspond to different first weight coefficients;

determining an area level of the sub-display-area based on a quantity ratio of the number of pixel units in the sub-display-area to the number of pixel units in the display array, wherein different area levels correspond to different second weight coefficients;

determining a to-be-displayed color information level of the sub-display-area based on the number of colors displayed in the sub-display-area when displaying the image based on the to-be-displayed data, wherein different to-be-displayed color information levels correspond to different third weight coefficients;

calculating a weight of the sub-display-area based on the three weight coefficients of the sub-display-area; and determining the priority of the sub-display-area based on the weight of the sub-display-area.

17. The method according to claim 16, wherein calculating the weight of the sub-display-area based on the three weight coefficients of the sub-display-area comprises:

$$W = \frac{a * W_1 + b * W_2 + c * W_3}{d};$$

$$\text{or, } W = W * W_3 * W_3;$$

wherein, W is the weight of the sub-display-area, $W_1$ is the first weight coefficient, $W_2$ is the second weight coefficient, $W_3$ is the third weight coefficient, a, b, c, d are all constants.

18. The method according to claim 16, wherein the display array is evenly divided into a plurality of sub-arrays arranged in an array, each sub-array comprises a plurality of pixel units and is provided with a first weight coefficient, and the first weight coefficient is negatively correlated with a center distance between the sub-array and the display array;

the determining the relative position level of the sub-display-area comprises:

determining the relative position level of the sub-display-area based on the sub-array where a center of the sub-display-area is located.

19. The method according to claim 16, wherein a first range to a N-th ratio range and the second weight coefficient corresponding to each ratio range are pre-stored; the first to N-th ratio ranges correspond to a first area level to N-th area level in sequence, and the second weight coefficients are decreased in sequence, N is a positive integer greater than 1;

the determining an area level of the sub-display-area comprises:

determining the area level of the sub-display-area based on the ratio range where the quantity ratio is located.

20. The method according to claim 1, wherein the corrected display data is configured to enable the pixel units to display at a first brightness, and the to-be-displayed data is configured to enable the pixel units to display at a second brightness, wherein the first brightness is greater than the second brightness.

21. An electronic device, comprising:

a display panel; and a display driver, configured to control the display panel to display an image based on a method for driving display of the display panel, wherein the display panel comprises a display array for displaying an image, the display array comprises a plurality of pixel units arranged in an array, the method comprises:

obtaining to-be-displayed data of the pixel units;

dividing the display array into at least two sub-display-areas with different priorities based on the to-be-displayed data of each of the plurality of pixel units, wherein each sub-display-area comprises a plurality of pixel units arranged consecutively; and controlling the pixel units in each sub-display-area for image display based on the priority, wherein controlling, for a sub-display-area with a highest priority in the at least two sub-display-areas, the pixel units for image display based on the to-be-displayed data;

controlling, for a sub-display-area with a non-highest priority in the at least two sub-display-areas, at least part of the pixel units for image display based on corrected display data.

* * * * *